(12) United States Patent
Chatterjee et al.

(10) Patent No.: US 10,936,759 B1
(45) Date of Patent: Mar. 2, 2021

(54) SYSTEMS, METHODS AND COMPUTER-READABLE MEDIA FOR PROVIDING ENHANCED ENCRYPTION IN A STORAGE SYSTEM

(71) Applicant: Amzetta Technologies, LLC, Norcross, GA (US)

(72) Inventors: Paresh Chatterjee, Fremont, CA (US); Raghavan Sowrirajan, Fremont, CA (US); Sakthi Kumar B, Chennai (IN); Soumyadarshi Adhikari, Chennai (IN)

(73) Assignee: Amzetta Technologies, LLC, Norcross, GA (US)

( * ) Notice: Subject to any disclaimer, the term of this patent is extended or adjusted under 35 U.S.C. 154(b) by 33 days.

(21) Appl. No.: 16/118,546

(22) Filed: Aug. 31, 2018

Related U.S. Application Data (60) Provisional application No. 62/553,186, filed on Sep. 1, 2017.

(51) Int. Cl.
| | |
|---|---|
| *G06F 21/80* | (2013.01) |
| *H04L 9/08* | (2006.01) |
| *G06F 3/06* | (2006.01) |
| *H04L 9/06* | (2006.01) |

(52) U.S. Cl.
CPC ............ *G06F 21/80* (2013.01); *G06F 3/064* (2013.01); *G06F 3/0623* (2013.01); *G06F 3/0644* (2013.01); *G06F 3/0659* (2013.01); *G06F 3/0673* (2013.01); *H04L 9/088* (2013.01); *H04L 9/0631* (2013.01)

(58) Field of Classification Search
CPC ........ G06F 21/80; G06F 3/0644; G06F 3/064; G06F 3/0659; G06F 3/0623; G06F 3/0673; H04L 9/088; H04L 9/0631
See application file for complete search history.

(56) References Cited

U.S. PATENT DOCUMENTS

| | | | |
|---|---|---|---|
| 8,799,681 B1* | 8/2014 | Linnell .................. | G06F 21/62 380/277 |
| 2008/0022131 A1* | 1/2008 | Ueda ..................... | G06F 21/805 713/193 |
| 2008/0056490 A1* | 3/2008 | Akishita ............... | H04L 9/0631 380/44 |
| 2010/0150350 A1* | 6/2010 | Reidenbach ......... | H04L 9/0631 380/277 |
| 2012/0331284 A1* | 12/2012 | Kouladjie .............. | H04L 9/088 713/153 |
| 2013/0064362 A1* | 3/2013 | Tang ........................ | H04L 9/16 380/29 |
| 2013/0086662 A1* | 4/2013 | Roth ....................... | G06F 21/31 726/7 |
| 2013/0086663 A1* | 4/2013 | Roth ..................... | H04L 9/3242 726/7 |

(Continued)

*Primary Examiner* — Cheng-Feng Huang
(74) *Attorney, Agent, or Firm* — Meunier Carlin & Curfman LLC (57) ABSTRACT

Described herein are systems, methods, and computer-readable media for providing enhanced encryption in a data storage system. An example method can include receiving a data set, selecting a first portion of the data set as a unique encryption key, encrypting a second portion of the data set using the unique encryption key, and writing the encrypted second portion of the data set to a storage device.

14 Claims, 9 Drawing Sheets

(56) References Cited

U.S. PATENT DOCUMENTS

| | | | | |
|---|---|---|---|---|
| 2013/0151581 A1* | 6/2013 | Leggette | ............... | H03M 13/05 |
| | | | | 709/201 |
| 2013/0151926 A1* | 6/2013 | Leggette | ............ | G06F 11/1092 |
| | | | | 714/763 |
| 2013/0290703 A1* | 10/2013 | Resch | ................ | H04L 67/1097 |
| | | | | 713/155 |
| 2014/0365745 A1* | 12/2014 | Colgrove | .............. | G06F 3/0644 |
| | | | | 711/170 |
| 2015/0012797 A1* | 1/2015 | Leggette | ............ | G06F 11/1076 |
| | | | | 714/763 |
| 2017/0244685 A1* | 8/2017 | Mirza | .................. | H04L 63/061 |

* cited by examiner

SYSTEMS, METHODS AND COMPUTER-READABLE MEDIA FOR PROVIDING ENHANCED ENCRYPTION IN A STORAGE SYSTEM

CROSS-REFERENCE TO RELATED APPLICATIONS

This application claims the benefit of U.S. provisional patent application No. 62/553,186, filed on Sep. 1, 2017, and entitled "SYSTEMS, METHODS AND COMPUTER-READABLE MEDIA FOR PROVIDING ENHANCED ENCRYPTION IN A STORAGE SYSTEM," the disclosure of which is expressly incorporated herein by reference in its entirety.

BACKGROUND

Disk encryption devices read data from a data buffer, encrypt the data, and store the encrypted data to the disk (e.g., an encrypted store). Conventionally, the encryption and decryption is performed using the same key, i.e., symmetric encryption. Thus, the same encryption key is used for encrypting plaintext and decrypting ciphertext. The fact that symmetric encryption uses the same key for encryption and decryption is a security concern because data can be decrypted if the key is compromised.

SUMMARY

An example computer-implemented method for providing enhanced encryption in a data storage system is described herein. The method can include receiving a data set, selecting a first portion of the data set as a unique encryption key, encrypting a second portion of the data set using the unique encryption key, and writing the encrypted second portion of the data set to a storage device.

Optionally, the method can further include encrypting the first portion of the data set using a user-defined encryption key, and writing the encrypted first portion of the data set to the storage device. Additionally, the method can optionally include restricting access to the user-defined encryption key, for example, using a password.

Alternatively or additionally, the method can optionally include partitioning the encrypted data set into a plurality of data blocks, and writing the plurality of data blocks in a non-sequential order to the storage device.

In some implementations, the plurality of data blocks can be written at a contiguous region of the storage device. Optionally, the method can further include maintaining a lookup table for storing the non-sequential order of the plurality of data blocks written at the contiguous region of the storage device.

In other implementations, the plurality of data blocks can be written at a plurality of non-contiguous regions of the storage device. Optionally, the method can further include maintaining a mapping table for storing respective physical locations of the plurality of data blocks written at the plurality of non-contiguous regions of the storage device. Additionally, the method can optionally further include serializing the plurality of data blocks of the encrypted data set with a plurality of data blocks of a second encrypted data set.

Alternatively or additionally, the first portion of the data set can be randomly selected. Alternatively or additionally, the first portion of the data set can be selected by a user. Alternatively or additionally, the first portion of the data set can be selected in dependence on a target logical volume for the data set.

It should be understood that the above-described subject matter may also be implemented as a computer-controlled apparatus, a computer process, a computing system, or an article of manufacture, such as a computer-readable storage medium.

Other systems, methods, features and/or advantages will be or may become apparent to one with skill in the art upon examination of the following drawings and detailed description. It is intended that all such additional systems, methods, features and/or advantages be included within this description and be protected by the accompanying claims.

BRIEF DESCRIPTION OF THE DRAWINGS

The components in the drawings are not necessarily to scale relative to each other. Like reference numerals designate corresponding parts throughout the several views.

DETAILED DESCRIPTION

Unless defined otherwise, all technical and scientific terms used herein have the same meaning as commonly understood by one of ordinary skill in the art. Methods and materials similar or equivalent to those described herein can be used in the practice or testing of the present disclosure. As used in the specification, and in the appended claims, the singular forms "a," "an," "the" include plural referents unless the context clearly dictates otherwise. The term "comprising" and variations thereof as used herein is used synonymously with the term "including" and variations thereof and are open, non-limiting terms. The terms "optional" or "optionally" used herein mean that the subsequently described feature, event or circumstance may or may not occur, and that the description includes instances where said feature, event or circumstance occurs and instances where it does not. While implementations will be described for providing enhanced encryption in a data storage system, it will become evident to those skilled in the art that the implementations are not limited thereto.

Figure 1:
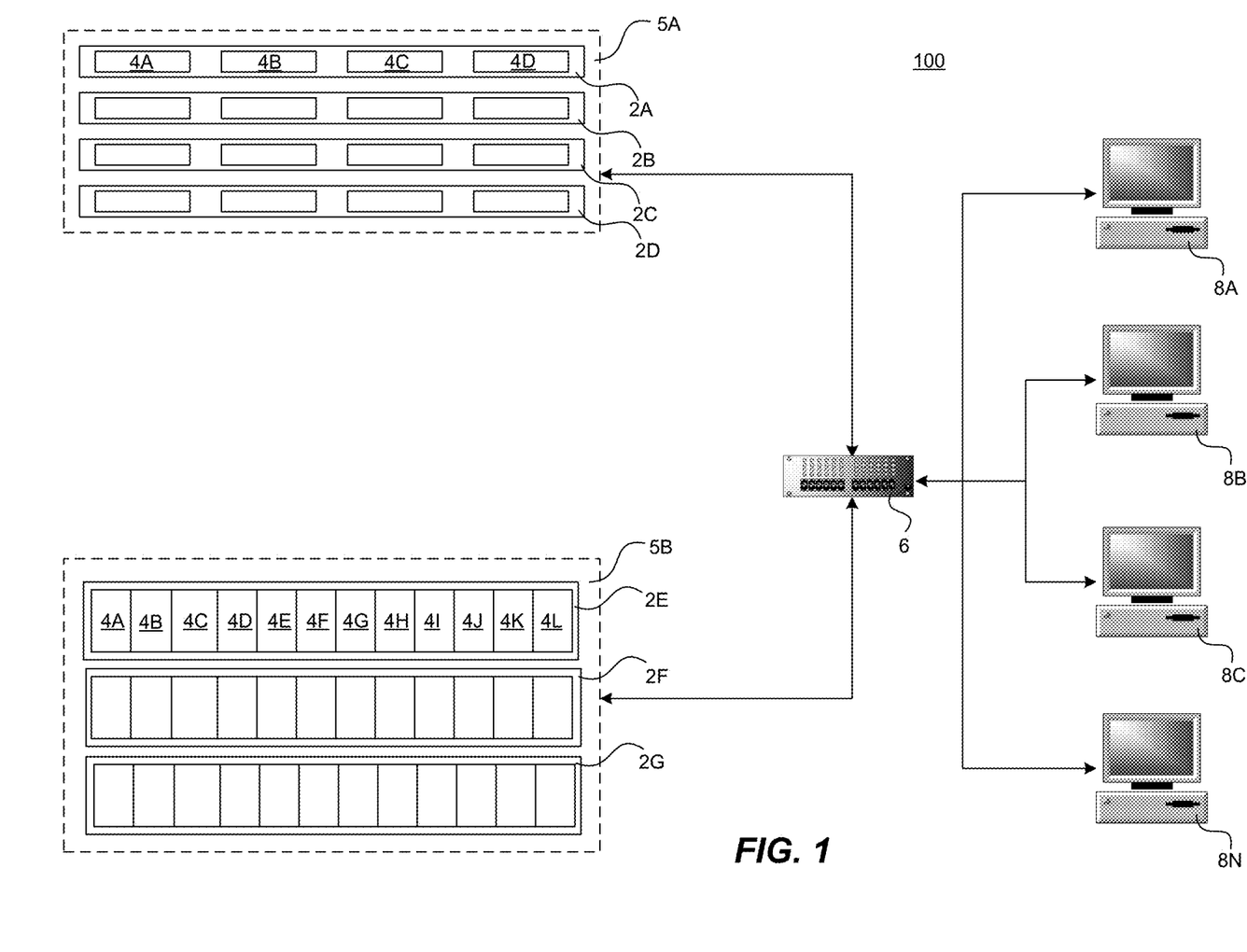
FIG. 1 is a computer architecture and network diagram showing aspects of a computer network and a storage server computer that can provide an operating environment for embodiments of the disclosure presented herein.
Figure 2:
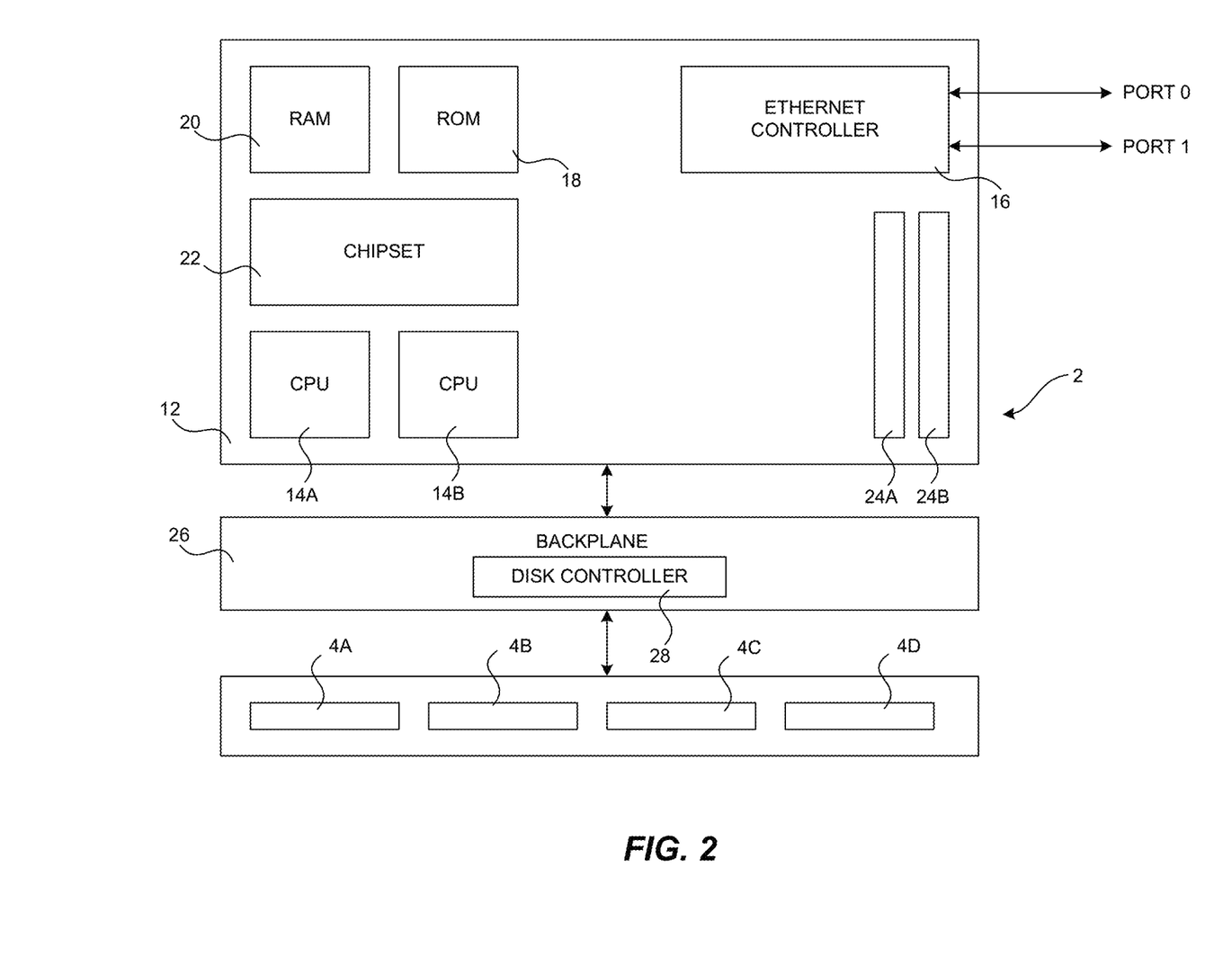
FIG. 2 is a computer architecture diagram illustrating aspects of the hardware of an illustrative storage server computer described herein.
Figure 3:
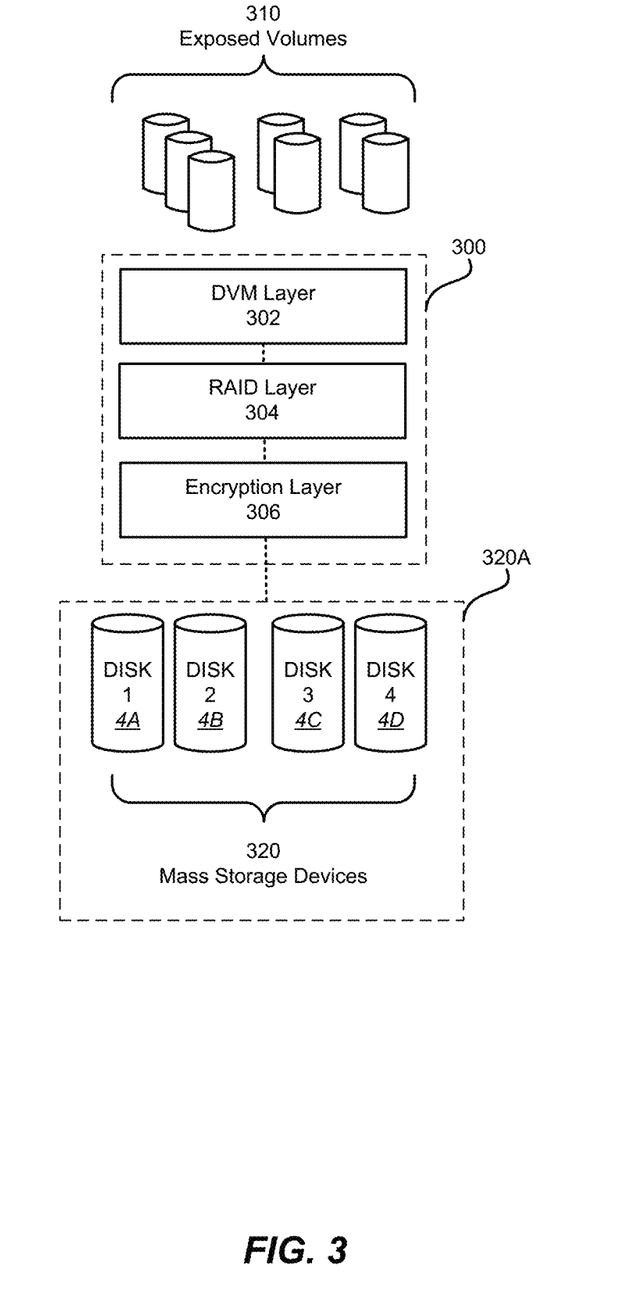
FIG. 3 is a software architecture diagram illustrating various aspects of a storage stack utilized by an illustrative storage server computer described herein.

FIGS. 1-3 and the following discussion are intended to provide a brief, general description of a suitable computing environment in which the embodiments described herein may be implemented. Generally, program modules include routines, programs, components, data structures, and other types of structures that perform particular tasks or implement particular abstract data types. Moreover, those skilled in the art will appreciate that the embodiments described herein may be practiced with other computer system configurations, including hand-held devices, multiprocessor systems, microprocessor-based or programmable consumer electronics, minicomputers, mainframe computers, and the like. The embodiments described herein may also be practiced in distributed computing environments where tasks are performed by remote processing devices that are linked through a communications network. In a distributed computing environment, program modules may be located in both local and remote memory storage devices. While the implementations presented herein will be described in the general context of program modules that execute in conjunction with an operating system on a computer system, those skilled in the art will recognize that they may also be implemented in combination with other program modules.

Turning now to FIG. 1, details will be provided regarding an illustrative operating environment for the implementations presented herein, as well as aspects of software components that provide the functionality described herein for providing enhanced encryption in a data storage system. In particular, FIG. 1 is a network architecture diagram showing aspects of a storage system 100 that includes several virtualized clusters 5A-5B. A virtualized cluster is a cluster of different storage nodes that together expose a single storage device. In the example storage system 100 shown in FIG. 1, the clusters 5A-5B (collectively, clusters 5) include storage server computers 2A-2G (also referred to herein as "storage nodes" or a "node", collectively nodes 2) that are operative to read and write data to one or more mass storage devices, such as hard disk drives. The cluster 5A includes the nodes 2A-2D and the cluster 5B includes the nodes 2E-2G. All of the nodes 2 in a cluster 5 can be physically housed in the same rack, located in the same building, or distributed over geographically diverse locations, such as various buildings, cities, or countries.

According to implementations, the nodes within a cluster may be housed in a one rack space unit storing up to four hard disk drives. For instance, the node 2A is a one rack space computing system that includes four hard disk drives 4A-4D (collectively, disks 4). Alternatively, each node may be housed in a three rack space unit storing up to fifteen hard disk drives. For instance, the node 2E includes hard disk drives 4A-4L. Other types of enclosures may also be utilized that occupy more or fewer rack units and that store fewer or more hard disk drives. In this regard, it should be appreciated that the type of storage enclosure and number of hard disk drives utilized is not generally significant to the implementation of the embodiments described herein. Any type of storage enclosure and virtually any number of hard disk devices or other types of mass storage devices may be utilized.

As shown in FIG. 1, multiple storage nodes may be configured together as a virtualized storage cluster. For instance, the nodes 2A-2D have been configured as a storage cluster 5A and the nodes 2E-2G have been configured as a storage cluster 5B. In this configuration, each of the storage nodes 2A-2G is utilized to handle I/O operations independently, but are exposed to the initiator of the I/O operation as a single device. It should be appreciated that a storage cluster may include any number of storage nodes. A virtualized cluster in which each node contains an independent processing unit, and in which each node can field I/Os independently (and route them according to the cluster layout) is called a horizontally virtualized or peer cluster. A cluster in which each node provides storage, but the processing and mapping is done completely or primarily in a single node, is called a vertically virtualized cluster.

Data may be striped across the nodes of each storage cluster. For instance, the cluster 5A may stripe data across the storage nodes 2A, 2B, 2C and 2D. The cluster 5B may similarly stripe data across the storage nodes 2E, 2F and 2G. Striping data across nodes generally ensures that different I/O operations are fielded by different nodes, thereby utilizing all of the nodes simultaneously, and that the same I/O operation is not split between multiple nodes. Striping the data in this manner provides a boost to random I/O performance without decreasing sequential I/O performance.

According to embodiments, each storage server computer 2A-2G includes one or more network ports operatively connected to a network switch 6 using appropriate network cabling. It should be appreciated that, according to embodiments of the invention, Ethernet or Gigabit Ethernet may be utilized. However, it should also be appreciated that other types of suitable physical connections may be utilized to form a network of which each storage server computer 2A-2G is a part. Through the use of the network ports and other appropriate network cabling and equipment, each node within a cluster is communicatively connected to the other nodes within the cluster. Many different types and number of connections may be made between the nodes of each cluster. Furthermore, each of the storage server computers 2A-2G need not be connected to the same switch 6. The storage server computers 2A-2G can be interconnected by any type of network or communication links, such as a LAN, a WAN, a MAN, a fiber ring, a fiber star, wireless, optical, satellite, or any other network technology, topology, protocol, or combination thereof.

Each cluster 5A-5B is also connected to a network switch 6. The network switch 6 is connected to one or more client computers 8A-8N (also referred to herein as "initiators"). It should be appreciated that other types of networking topologies may be utilized to interconnect the clients and the clusters 5A-5B. It should also be appreciated that the initiators 8A-8N may be connected to the same local area network (LAN) as the clusters 5A-5B or may be connected to the clusters 5A-5B via a distributed wide area network, such as the Internet. An appropriate protocol, such as the Internet Small Computer Systems Interface ("iSCSI") or Fiber Channel protocol may be utilized to enable the initiators 8A-8N to communicate with and utilize the various functions of the storage clusters 5A-5B over a wide area network such as the Internet. An appropriate protocol, such as iSCSI, Fiber Channel, or Serial Attached SCSI ("SAS"), is also used to enable the members of the storage cluster to communicate with each other. These two protocols need not be similar.

As used herein, a storage device is sometimes referred to as a disk such as one or more of disks 4. Additionally, a storage device or disk is also sometimes referred to herein as a mass storage device. Examples of the disks 4 may include hard drives, spinning disks, stationary media, non-volatile memories, solid state devices, or optically scanned media; each, or in combination, employing magnetic, capacitive, optical, semiconductor, electrical, quantum, dynamic, static, or any other data storage technology. The disks 4 may use IDE, ATA, SATA, PATA, SCSI, USB, PCI, Firewire, or any other bus, link, connection, protocol, network, controller, or combination thereof for I/O transfers.

Referring now to FIG. 2, an illustrative computer hardware architecture for practicing various embodiments will now be described. In particular, FIG. 2 shows an illustrative computer architecture and implementation for each storage node 2. In particular, each storage server computer 2 includes a baseboard 12, or "motherboard," which is a printed circuit board to which a multitude of components or devices may be connected by way of a system bus or other electrical communication path. In one illustrative embodiment, these components include, without limitation, one or more central processing units ("CPUs") 14A-14B, a network adapter, such as the Ethernet controller 16, a system memory, including a Read Only Memory 18 ("ROM") and a Random Access Memory 20 ("RAM"), and other hardware for performing input and output, such as a video display adapter or a universal serial bus port ("USB"), not all of which are illustrated in FIG. 2.

The motherboard 12 may also utilize a system board chipset 22 implementing one or more of the devices described herein. One or more hardware slots 24A-24B may also be provided for expandability, including the addition of a hardware RAID controller to the storage server computer 2. It should also be appreciate that, although not illustrated in FIG. 2, a RAID controller may also be embedded on the motherboard 12 or implemented in software by the storage server computer 2. It is also contemplated that the storage server computer 2 may include other components that are not explicitly shown in FIG. 2 or may include fewer components than illustrated in FIG. 2.

As described briefly above, the motherboard 12 utilizes a system bus to interconnect the various hardware components. The system bus utilized by the storage server computer 2 provides a two-way communication path for all components connected to it. The component that initiates a communication is referred to as a "master" component and the component to which the initial communication is sent is referred to as a "slave" component. A master component therefore issues an initial command to or requests information from a slave component. Each slave component is addressed, and thus communicatively accessible to the master component, using a particular slave address. Both master components and slave components are operable to transmit and receive communications over the system bus. Buses and the associated functionality of master-slave communications are well-known to those skilled in the art, and therefore not discussed in further detail herein.

As discussed briefly above, the system memory in the storage server computer 2 may include including a RAM 20 and a ROM 18. The ROM 18 may store a basic input/output system ("BIOS") or Extensible Firmware Interface ("EFI") compatible firmware that includes program code containing the basic routines that help to transfer information between elements within the storage server computer 2. As also described briefly above, the Ethernet controller 16 may be capable of connecting the local storage server computer 2 to the initiators 8A-8N via a network. Connections which may be made by the network adapter may include LAN or WAN connections. LAN and WAN networking environments are commonplace in offices, enterprise-wide computer networks, intranets, and the Internet. The CPUs 14A-14B utilized by the storage server computer 2 are standard central processing units that perform the arithmetic and logical operations necessary for the operation of the storage server computer 2. CPUs are well-known in the art, and therefore not described in further detail herein. A graphics adapter may or may not be utilized within the storage server computer 2 that enables the display of video data (i.e., text and/or graphics) on a display unit.

As shown in FIG. 2, the motherboard 12 is connected via a backplane 26 and disk controller 28 to one or more mass storage devices. The mass storage devices may comprise hard disk drives 4A-4D or other types of high capacity high speed storage. The disk controller 28 may interface with the hard disk drives 4A-4D through a serial advanced technology attachment ("SATA") interface, a small computer system interface ("SCSI"), a fiber channel ("FC") interface, a SAS interface, or other standard interface for physically connecting and transferring data between computers and physical storage devices. The mass storage devices may store an operating system suitable for controlling the operation of the storage server computer 2, such as the LINUX operating system. The hard disk drives may also store application programs and virtually any other type of data. It should be appreciated that the operating system comprises a set of programs that control operations of the storage server computer 2 and allocation of resources. The set of programs, inclusive of certain utility programs, may also provide a graphical user interface to a user. An application program is software that runs on top of the operating system software and uses computer resources made available through the operating system to perform application specific tasks desired by the user.

The mass storage devices (e.g., storage devices) and their associated computer-readable media, provide non-volatile storage for the storage server computer 2. Although the description of computer-readable media contained herein refers to a mass storage device, such as a hard disk or CD-ROM drive, it should be appreciated by those skilled in the art that computer-readable media can be any available media that can be accessed by the local storage server. By way of example, and not limitation, computer-readable media may comprise computer storage media. Computer storage media includes tangible, volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

Referring now to FIG. 3, an example computer software architecture for practicing the various embodiments presented herein will now be described. The computer software architecture can be implemented in the storage node 2 shown in FIGS. 1 and 2, for example. In particular, FIG. 3 illustrates a storage stack 300 used in the embodiments described herein. The storage stack 300 can include a distributed volume management ("DVM") layer 302, a RAID layer 304, and an encryption layer 306. At the top of the storage stack 300, storage volumes 310 are exposed, for example, to the initiators 8A-8N shown in FIG. 1. At the bottom of the storage stack 300 are the mass storage devices 320, such as the disks 4A-4D, that are used to store the data. As discussed above, the mass storage devices are connected to a disk controller such as the disk controller 28 shown in FIG. 2. The disk controller interfaces with the mass storage devices using any standard interface such as SATA, SCSI, FC, SAS interface, etc. for physically connecting and transferring data between computers and the mass storage devices.

The storage stack 300 can include the encryption layer 306. The encryption layer 306 can optionally be implemented as software in a layer between application program(s) running on a storage node (e.g., storage node 2 of FIGS. 1 and 2) and the drivers for the mass storage devices 320. Alternatively or additionally, the encryption layer 306 can optionally be implemented on the storage node in software, hardware, or a combination thereof. In this way, the process of encryption is transparent to users of the data storage system. Data (i.e., plaintext) is encrypted after it is produced by an application program but before it is written to one or more of the mass storage devices 320. Conversely, encrypted data (i.e., ciphertext) is decrypted after it is read from one or more of the mass storage devices 320 but before it is returned to the application program.

For example, a data set (e.g., plaintext) can be encrypted against a key using an encryption algorithm, which transforms the plaintext into ciphertext. The ciphertext is then written to the storage device (e.g., an encrypted store), such as one or more of the mass storage devices 320. This provides for data security because the ciphertext must be decrypted against the key in order to transform the ciphertext back into plaintext. Encryption algorithms (e.g., Advanced Encryption Standard (AES)) are known in the art. For example, encryption algorithms can generate a plurality of round keys (e.g., a key schedule) from a key. During each round, one of the round keys is applied to data. Example operations during each round can include, but are not limited to, substitution, permutation, or mixing (e.g., XOR operation). Optionally, single instruction, multiple data (SIMD), such as MMX of INTEL CORP. of Santa Clara, Calif., powered encryption algorithms can be used. This disclosure contemplates using known encryption algorithms with the enhanced encryption techniques described herein.

Optionally, the mass storage devices 320 can be organized into a RAID array 320A. The RAID level used for the RAID array 320A can depend on a number of factors, such as the redundancy level, performance requirements and reliability of the desired array. For example, the mass storage devices 320 can organized into a RAID 5 array, e.g., block-level striping across the RAID array 320A with parity data distributed across all members of the RAID array 320A. It will be appreciated, however, that the embodiments described herein may be used with storage nodes 2 connected to a RAID array 320A organized with other standard RAID levels where redundant information is included in the storage of the array, including RAID 1, RAID 4 and RAID 6, as well as hybrid levels such as RAID 50 or RAID 60.

The RAID array 320A is accessed through the RAID layer 304. The RAID layer 304 abstracts the organization of the RAID array 320A and presents a logical block-level interface to higher layers (e.g., the DVM layer 302) in the storage stack 300. The RAID layer 304 can be implemented on the storage node 2 in software, hardware, or a combination thereof. For example, the RAID layer 304 can be provided by the MD kernel extension provided by the LINUX operating system. Alternatively or additionally, the RAID layer 304 can be provided by a STORTRENDS® storage solution from AMERICAN MEGATRENDS, INC. of NORCROSS, GEORGIA, installed in the storage node 2. Additionally, the RAID layer 304 can optionally be implemented by software and/or hardware components from a variety of vendors beyond those described herein.

The DVM layer 302 uses the block-level interface provided by the RAID layer 304 to manage the available storage capacity of the RAID array 320A and service I/O operations initiated by the initiators 8A-8N. The DVM layer 302 can implement a variety of storage management functions, such as volume virtualization, thin provisioning, snapshots, locking, data replication, etc. The DVM layer 302 can be implemented on the storage node 2 in software, hardware or a combination thereof. Volume virtualization provides the facility to create and manage multiple, logical volumes on the RAID array 320A, as well as expand a logical volume across multiple storage nodes within a storage cluster. Thin provisioning provides for the allocation of physical capacity of the RAID array 320A to logical volumes on an as-needed basis. For example, the available physical storage capacity of the RAID array 320A can be divided into a number of unique, equally-sized areas referred to as territories and further subdivide into unique, equally-sized areas referred to as provisions. A territory can optionally be an 8 MB portion of the available storage capacity and a provision can optionally be a 512 KB portion of the available storage capacity, for example. Alternatively, it should be understood that a territory and a provision can optionally have a size more or less than 8 MB and 512 KB, respectively. The available physical storage capacity can be provisioned on an as-needed basis, for example, as new writes are received. Snapshots provide functionality for creating and utilizing point-in-time snapshots of the contents of logical storage volumes. The locking functionality allows for synchronizing I/O operations within the storage node 2 or across nodes within the storage cluster. Data replication provides functionality for replication of data within the storage node 2 or across nodes within the storage cluster 2.

Figure 4:
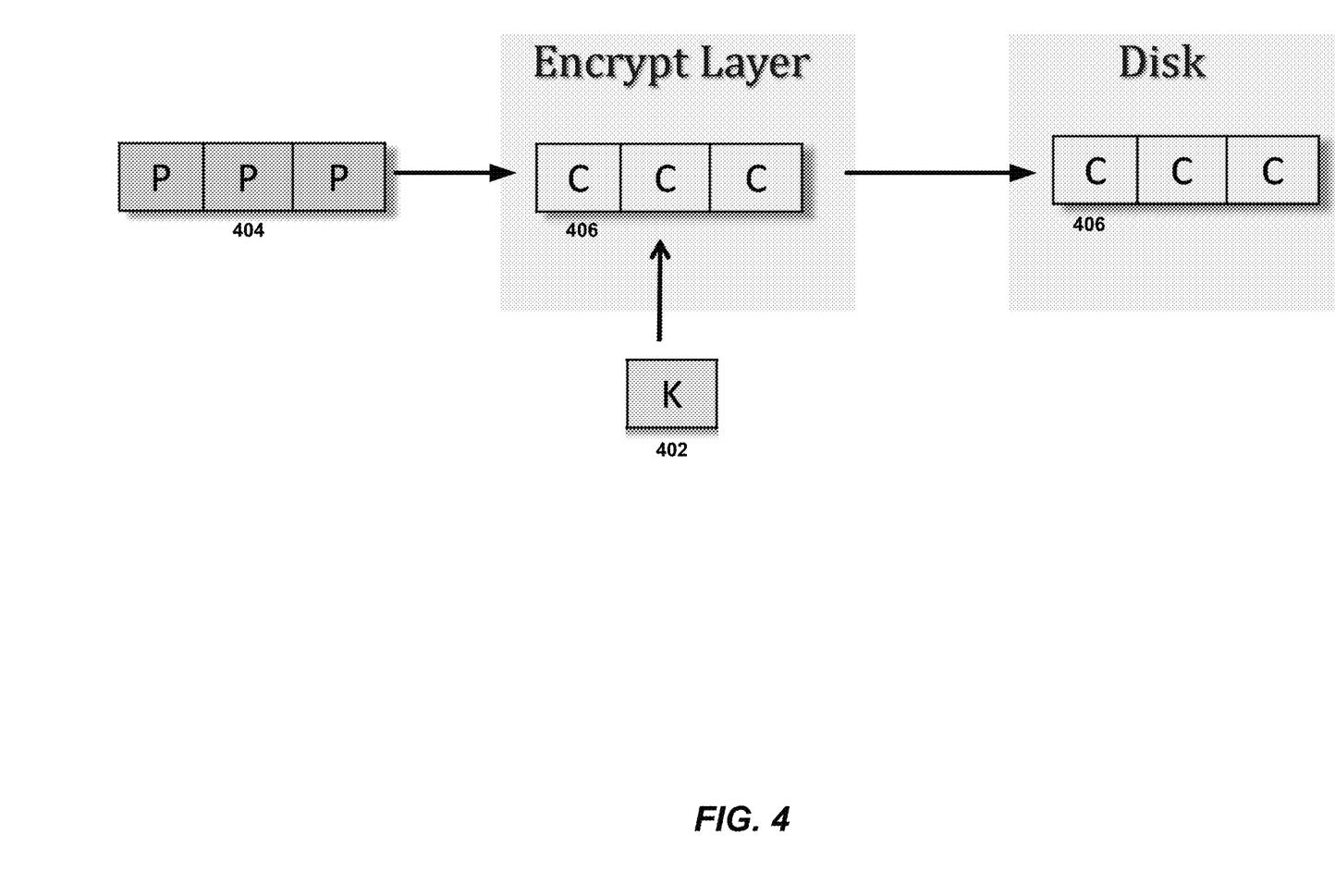
FIG. 4 is a diagram illustrating symmetric encryption.

Referring now to FIG. 4, a diagram illustrating symmetric encryption is shown. Symmetric encryption uses the same encryption key (e.g., key 402) for encrypting plaintext (e.g., plaintext 404) and decrypting ciphertext (e.g., ciphertext 406). In FIG. 4, the plaintext 404 can optionally be stored in memory such as a data buffer, for example, before encryption. The plaintext 404 can then be encrypted against the key 402 using an encryption algorithm to transform it into the ciphertext 406. The ciphertext 406 is the output of the encryption algorithm.

In some implementations, the plaintext 404 can be encrypted (or the ciphertext 406 decrypted) a bit or byte at a time using a symmetric stream cipher, for example. Alternatively, in other implementations, the plaintext 404 can optionally be encrypted (or the ciphertext 406 decrypted) a fixed-sized block (e.g., 32 bytes) at a time using a symmetric block cipher, for example. After the plaintext 404 is encrypted using the key 402, the ciphertext 406 can be written to the storage device (e.g., a disk) as shown in FIG. 4. Additionally, the ciphertext 406 can be decrypted using the key 402 to transform it back into the plaintext 404.

Figure 5A:
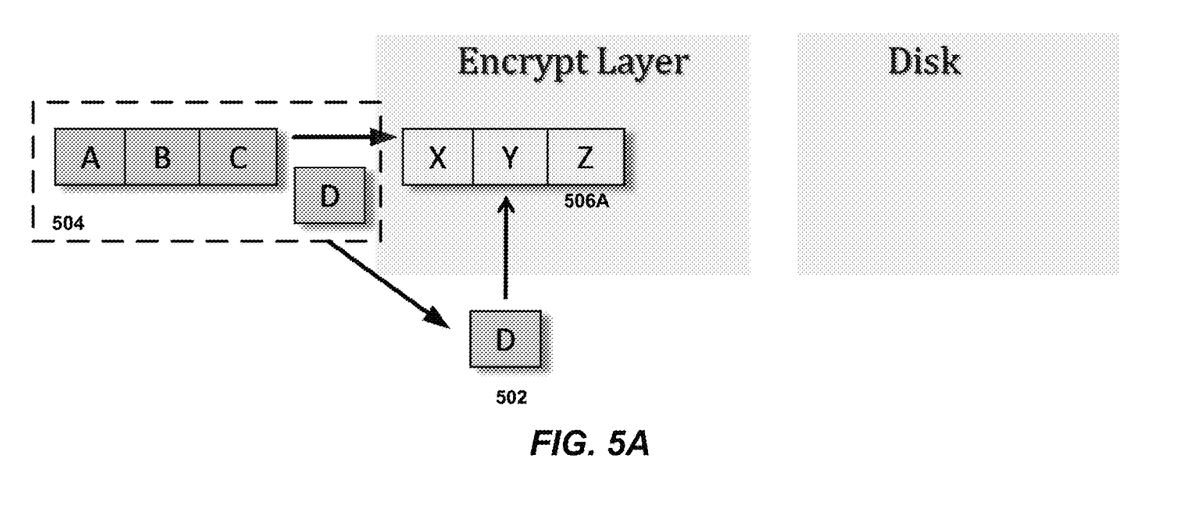
FIGS. 5A-5B are diagrams illustrating enhanced encryption according to an example implementation described herein.
Figure 5B:
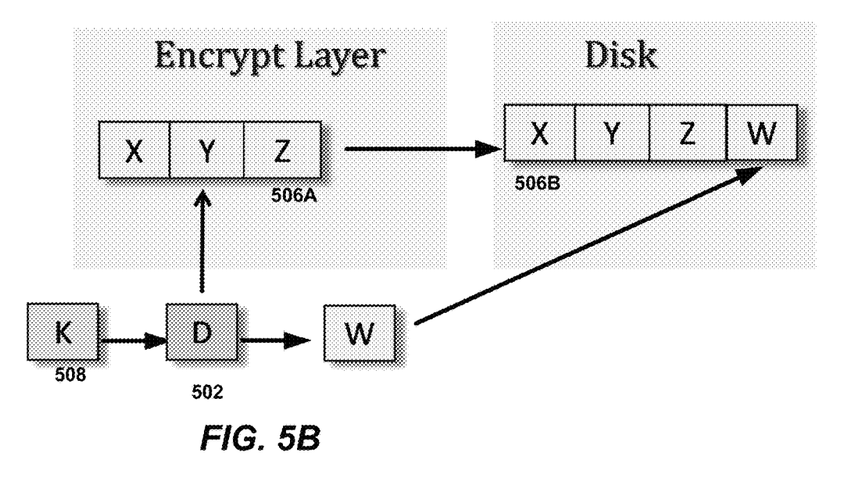

Referring now to FIGS. 5A-5B, diagrams illustrating enhanced encryption according to an example implementation is shown. The enhanced encryption can include using a dynamic key (e.g., unique encryption key 502) such as a portion of the plaintext. For example, in FIG. 5A, a data set 504 (e.g., the plaintext) can be encrypted. The data set 504 is shown in the dashed box in FIG. 5A. The data set 504 can be partitioned into a plurality of data blocks (e.g., data blocks A, B, C, D). Each of the data blocks can be a bit, a byte, or a fixed-sized block. A data block can have any size including, but not limited to, 128, 192, or 256 bits, for example. The unique encryption key 502 can be a first portion of the data set 504 (e.g., data block D in FIGS.

5A-5B). Optionally, the first portion of the data set can be randomly selected. Alternatively or additionally, the first portion of the data set can optionally be selected by a user such as the data storage system administrator, for example. This ensures that those in the manufacturing organization (e.g., developers, programmers, product specialists, etc.) are not aware of which portion of the data set is selected as the unique encryption key. In this case, the user-defined key (i.e., the key deciding which portion of the data set to select as the unique encryption key) can optionally be stored on removable media (e.g., CD-ROM, DVD-ROM, USB drive, etc.) and/or have access restricted to certain used (e.g., by password). Alternatively or additionally, the first portion of the data set can optionally be selected in dependence on the logical volume where the data set 504 will ultimately be stored. In other words, the first portion of the data set can optionally be selected based on a target logical volume for the data set such that the unique encryption keys for data sets destined for different logical volumes can be different. This ensures that only a person with knowledge of the encryption software would be capable of decrypting the data. Selecting a portion of the data set 504 as the unique encryption key 502 increases the security level of encryption as compared to symmetric encryption described with regard to FIG. 4 because different data sets are encrypted using different keys. Thus, only a person with knowledge of the encryption software would be capable of decrypting the data.

As shown in FIGS. 5A-5B, a second portion of the data set (e.g., data blocks A-C) can be encrypted against the first portion of the data set (e.g., data block D), which serves the unique encryption key 502, using an encryption algorithm. As described above, known encryption algorithms can be used. As described above, the data set 504 can be encrypted a bit, a byte, or a fixed-sized block at a time. The ciphertext 506A is the output of the encryption algorithm. Using the encryption algorithm, the plaintext (e.g., the second portion of the data set) is transformed into the ciphertext 506A. In FIGS. 5A-5B, ciphertext 506A includes a plurality of data blocks (e.g., data blocks X, Y, Z). The ciphertext 506A can then be written to the storage device (e.g., a disk). It should be understood that the ciphertext 506A can be decrypted against the unique encryption key 502 such that it is transformed into the plaintext (e.g., the second portion of the data set).

Optionally, as shown in FIG. 5B, the unique encryption key 502 (i.e., the first portion of the data set) can also be encrypted against a user-defined encryption key 508. The unique encryption key 502 and the user-defined encryption key 508 can be different from one another. Similar as described above, the unique encryption key 502 (e.g., the plaintext) can be encrypted against the user-defined encryption key 508 using an encryption algorithm to transform it into ciphertext (e.g., data block W, which is also sometimes referred to as the encrypted first portion of the data set). Additionally, the entire encrypted data set 506B, including the encrypted first portion of the data set (e.g., data block W) and the ciphertext 506A, can be written the storage device (e.g., a disk) as shown in FIG. 5B. It should be understood that the encrypted first portion of the data set can be decrypted against the user-defined encryption key 508 to transform it into the plaintext (e.g., the first portion of the data set). Optionally and additionally, access to the user-defined encryption key 508 can be restricted to users with certain credentials. For example, access to the user-defined encryption key 508 can be restricted by password. In addition, policies can be established for password recovery (or non-recovery), password expiration, password reset, etc.

Alternatively or additionally, the user-defined encryption key 508 can optionally be stored on removable media (e.g., CD-ROM, DVD-ROM, USB drive, etc.) or on a remote network drive.

Figure 6A:
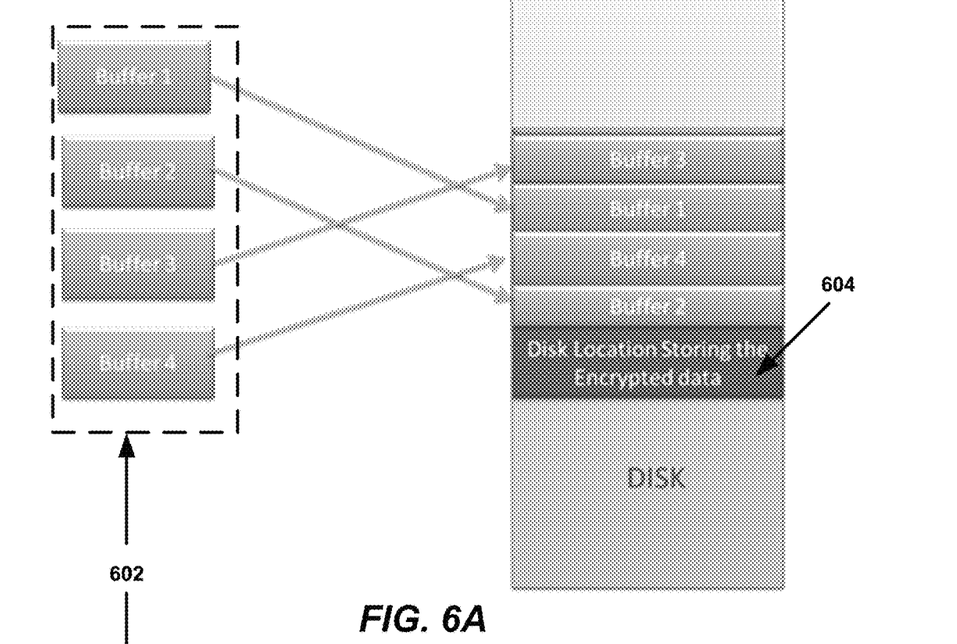
FIGS. 6A-6B are diagrams illustrating enhanced encryption according to another example implementation described herein.
Figure 6B:
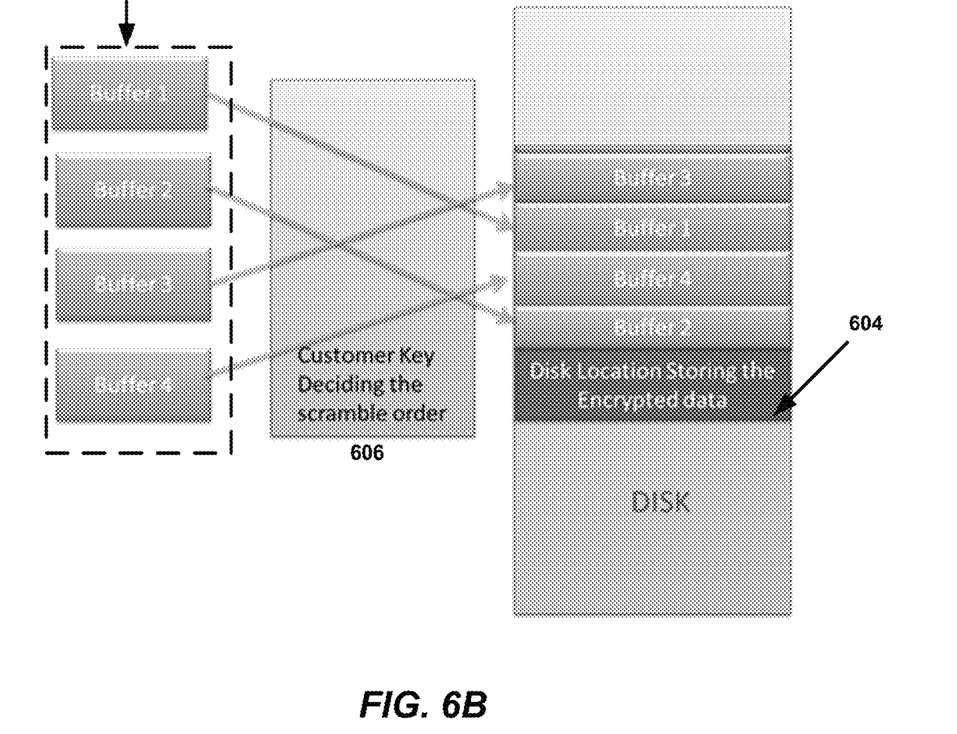

Referring now to FIGS. 6A-6B, diagrams illustrating enhanced encryption according to another example implementation is shown. The encrypted data set (e.g., the ciphertext) can be partitioned into a plurality of data blocks. A data block can have any size including, but not limited to, 128, 192, or 256 bits, for example. The encrypted data set can optionally be obtained as described with regards to FIGS. 5A-5B, e.g., where the ciphertext includes data blocks X, Y, Z, W. Additionally, the encrypted data set can be written in a non-sequential order to the storage device (e.g., a disk). In other words, the data blocks of the encrypted data set can be written in a jumbled fashion to the disk. In FIGS. 6A-6B, the encrypted data set is written to a contiguous region 604 of the disk. Optionally, the data blocks of the encrypted data set can be written to the disk in a non-sequential order using vectored input/output (I/O) operations (e.g., scatter-gather I/O operations). Scatter-gather I/O operations, where data is sequentially written (e.g., scattered) from a plurality of buffers to a data stream or sequentially read (e.g., gathered) from a data stream to a plurality of buffers, are known in the art. For example, each data block of the encrypted data set can be stored in a plurality of buffers 602. The four buffers (e.g., Buffers 1-4) shown in FIGS. 6A-6B are provided only as examples. This disclosure contemplates that the encrypted data set can include more or less than four data blocks, e.g., requiring more or less than four buffers. The data blocks of the encrypted data set can then be written from Buffers 1-4 in a non-sequential order to the disk. In FIGS. 6A-6B, the data blocks are written to the contiguous region of the disk in order from Buffer 3, Buffer 1, Buffer 4, and Buffer 2, which is provided only as an example order.

Optionally, as shown in FIG. 6B, a lookup key 606 can be used to define the non-sequential order in which the data blocks of the encrypted data set are written to the disk. For example, the lookup key 606 can be a lookup table that stores the non-sequential order in which the data blocks of the encrypted data set are written to the disk. Optionally and additionally, access to the lookup key 606 can be restricted to users with certain credentials, e.g., with a password. Alternatively or additionally, the lookup key 606 can optionally be stored on removable media (e.g., CD-ROM, DVD-ROM, USB drive, etc.) or on a remote network drive.

Figure 7:
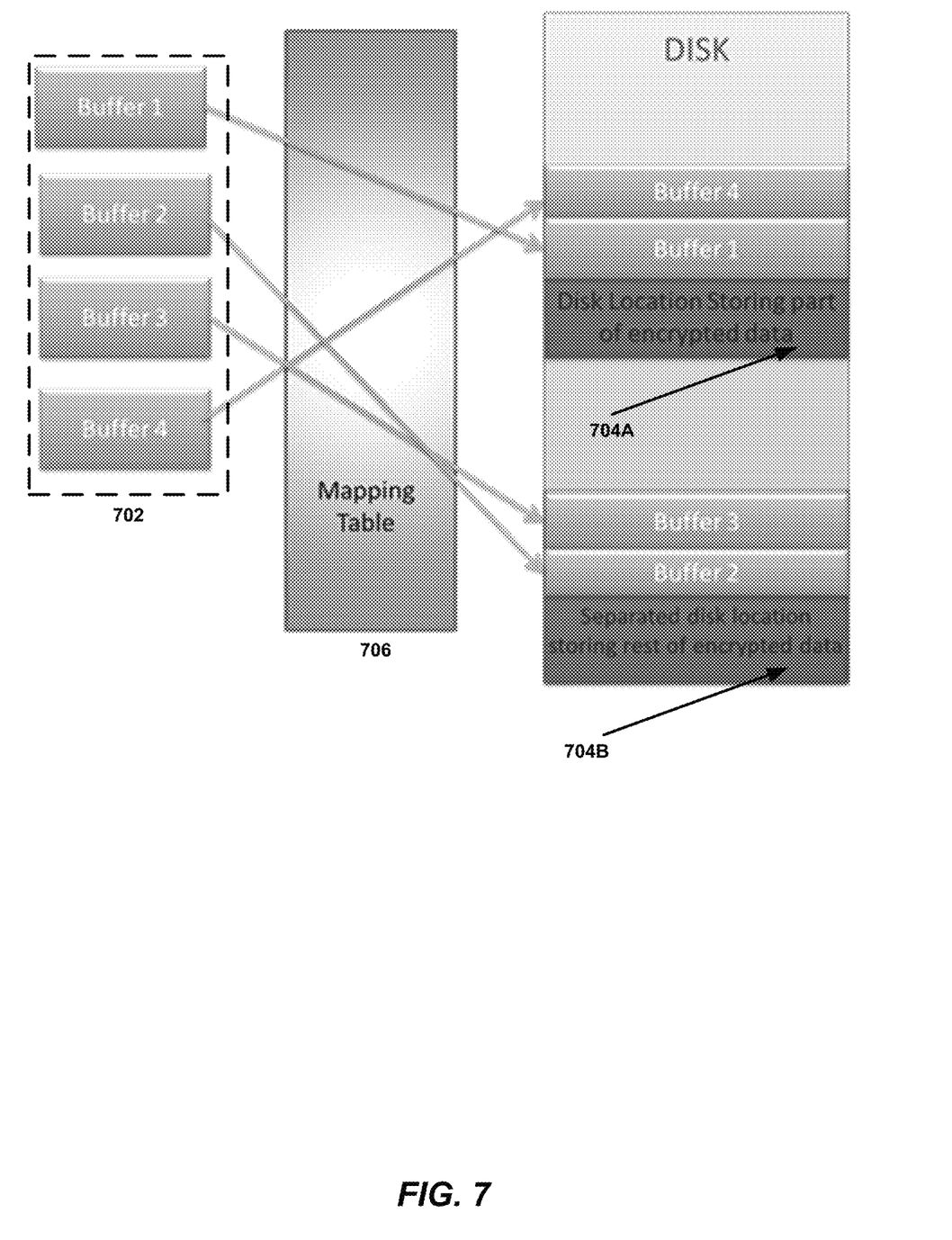
FIG. 7 is a diagram illustrating enhanced encryption according to yet another example implementation described herein.

Referring now to FIG. 7, a diagram illustrating enhanced encryption according to yet another example implementation is shown. The encrypted data set can optionally be obtained as described with regards to FIGS. 5A-5B, e.g., where the ciphertext includes data blocks X, Y, Z, W. Additionally, the encrypted data set can be written in a non-sequential order to the storage device (e.g., a disk). In other words, the data blocks of the encrypted data set can be written in a jumbled fashion to the disk. In FIG. 7, the encrypted data set is written to a plurality of regions 704A and 704B (collectively referred to as "non-contiguous regions 704") of the disk. For example, each data block of the encrypted data set can be stored in a plurality of buffers 702. The four buffers (e.g., Buffers 1-4) shown in FIG. 7 are provided only as examples. This disclosure contemplates that the encrypted data set can include more or less than four data blocks, e.g., requiring more or less than four buffers. The data blocks of the encrypted data set can then be written from Buffers 1-4 in a non-sequential order to the disk. In FIG. 7, the data blocks stored in Buffer 4 and Buffer 1 are written to a first region 704A of the disk, and the data blocks stored in Buffer 3 and Buffer 2 are written to a second region 704B of the disk. The first and second regions 704A and 704B are non-contiguous physical storage locations of the disk. It should be understood that the order in which the data blocks of the encrypted data set are written to the disk is provided only as an example. Additionally, it should be understood that the two non-contiguous regions 704 shown in FIG. 7 are provided only as an example and that the data blocks of the encrypted data set can be written to more than two non-contiguous regions of the disk.

Optionally, a mapping table 706 can map respective portions of the encrypted data set to respective physical storage regions of the disk. For example, the mapping table 706 can map the data blocks of the encrypted data set stored in Buffer 4 and Buffer 1 to the first region 704A of the disk and map the data blocks of the encrypted data set stored in Buffer 3 and Buffer 2 to the second region 704B of the disk. For example, the mapping table 706 can map logical addresses of data blocks of the encrypted data set to physical storage addresses of the disk. Although scattering the data blocks of the encrypted data set to different physical locations of the disk (and maintaining a mapping table) imposes a performance penalty, this results in increased data security because a raw read of the data from the disk cannot be decrypted. Additionally, as described below with regard to FIG. 8, this performance penalty can be minimized when a plurality of encrypted data sets are being written to the disk together in a single sequential data stream.

Figure 8:
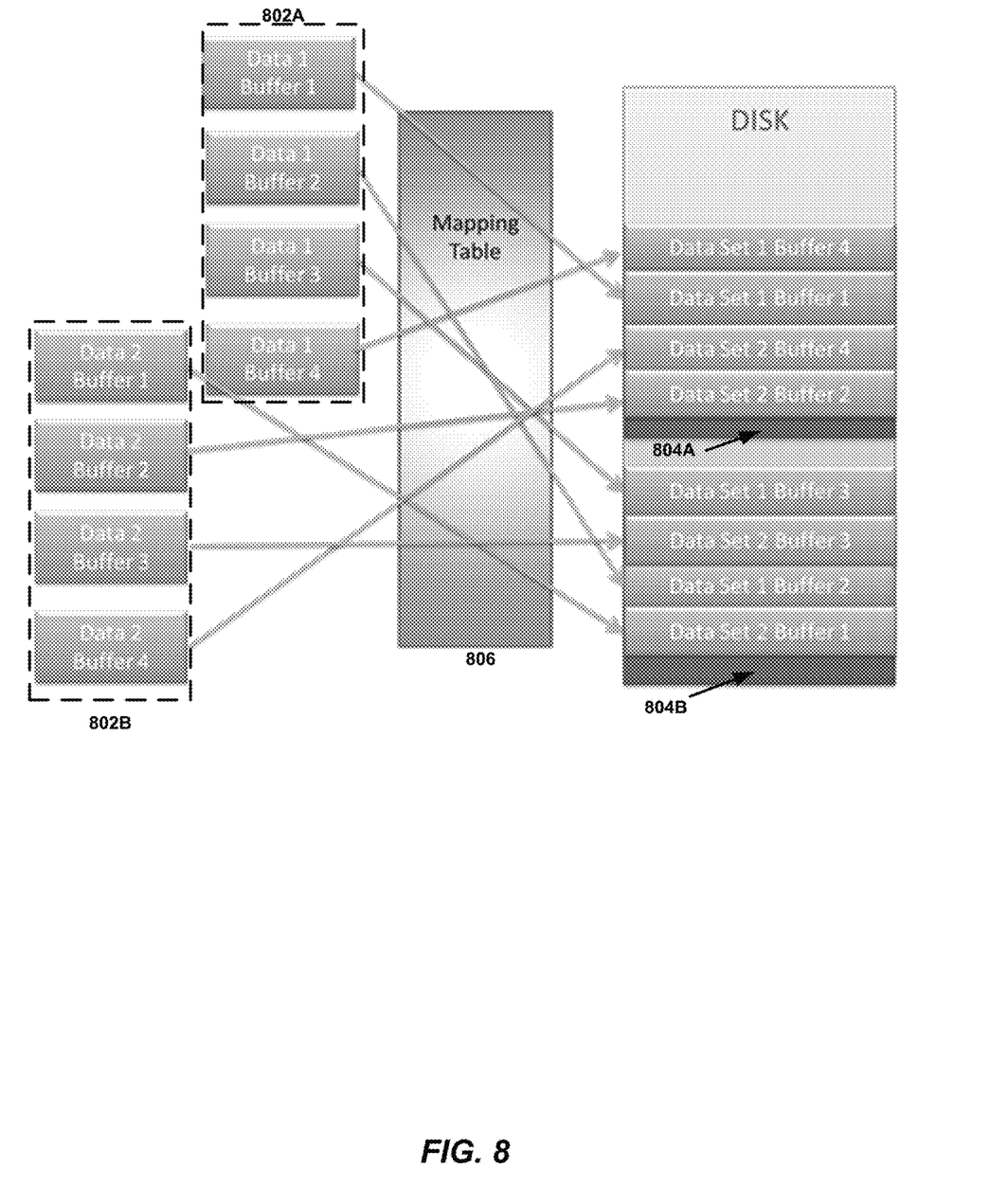
FIG. 8 is a diagram illustrating enhanced encryption according to yet another example implementation described herein.

Referring now to FIG. 8, a diagram illustrating enhanced encryption according to yet another example implementation is shown. In FIG. 8, a first encrypted data set is stored in a first plurality of buffers 802A, and a second encrypted data set is stored in a second plurality of buffers 802B. The encrypted data sets can optionally be obtained as described with regards to FIGS. 5A-5B, e.g., where the ciphertext includes data blocks X, Y, Z, W. Similar as described above with regard to FIG. 7, each of the encrypted data sets is written to a plurality of regions 804A and 804B of the disk, which are non-contiguous physical storage locations. In FIG. 8, the data blocks stored in Buffer 4 and Buffer 1 of the first plurality of buffers 802A, as well as the data blocks stored in Buffer 4 and Buffer 2 of the second plurality of buffers 802B, can be written to a first region 804A of the disk. The data blocks stored in Buffer 4 and Buffer 1 of the first plurality of buffers 802A can be serialized into a data stream with the data blocks stored in Buffer 4 and Buffer 2 of the second plurality of buffers 802B, which is then written to the first region 804A of the disk. Additionally, in FIG. 8, the data blocks stored in Buffer 3 and Buffer 2 of the first plurality of buffers 802A, as well as the data blocks stored in Buffer 3 and Buffer 1 of the second plurality of buffers 802B, can be written to a second region 804B of the disk. The data blocks stored in Buffer 3 and Buffer 2 of the first plurality of buffers 802A can be serialized into a different data stream with the data blocks stored in Buffer 3 and Buffer 1 of the second plurality of buffers 802B, which is then written to the second region 804B of the disk. The different data streams can be creating using vectored I/O operations (e.g., scatter-gather I/O operations). Similar as described above with regard to FIG. 7, a mapping table 806 can map respective portions of the encrypted data sets to respective physical storage regions of the disk. For example, the mapping table 806 can map logical addresses of data blocks of the encrypted data sets to physical storage addresses of the disk. Because portions (e.g., data blocks) of a plurality of encrypted data sets are serialized into a data stream that is being written to the disk, the performance penalty imposed by scattering the data blocks of an encrypted data sets to different physical locations of the disk is minimized.

Figure 9:
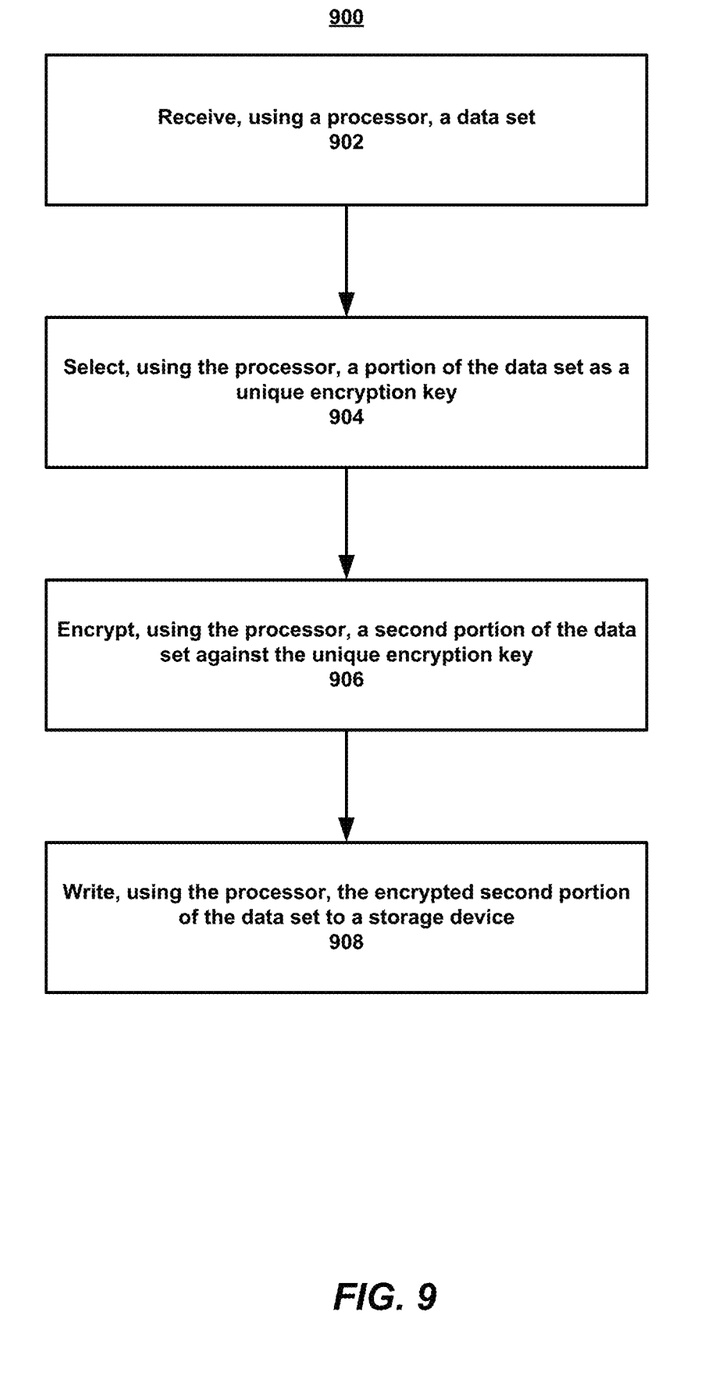
FIG. 9 is a flow diagram illustrating example operations for providing enhanced encryption in a data storage system.

Referring now to FIG. 9, a flow diagram illustrating example operations 900 for providing enhanced encryption in a data storage system (e.g., storage system 100 of FIG. 1) is shown. It should be appreciated that the logical operations described herein with respect to the various figures may be implemented (1) as a sequence of computer implemented acts or program modules (i.e., software) running on a computing device, (2) as interconnected machine logic circuits or circuit modules (i.e., hardware) within the computing device and/or (3) a combination of software and hardware of the computing device. Thus, the logical operations discussed herein are not limited to any specific combination of hardware and software. For example, in some implementations, the example operations can be implemented in software that is executed by a storage server computer such as storage node 2 of FIGS. 1 and 2. The implementation is a matter of choice dependent on the performance and other requirements of the computing device. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

At 902, a data set can be received, for example, by a processor of a storage server computer such as storage node 2 of FIGS. 1 and 2. The data set (e.g., data set 504 of FIGS. 5A-5B) can be plaintext (e.g., unencrypted data). Optionally, as described above, the data set can include a plurality of data blocks. At 904, a portion of the data set can be selected as a unique encryption key. For example, one or more of the data blocks of the data set can be selected. As shown in FIGS. 5A and 5B, the unique encryption key is data block D of the data set 504. Optionally, as described above, the portion of the data set that serves as the unique encryption key can be selected randomly, selected by a user such as the data storage system administrator, or selected in dependence on the data set itself (e.g., based on the target logical volume to which the data set will be stored). Because the unique encryption key is different for different data sets, the level of security provided by using the encryption technique is enhanced as compared to conventional encryption techniques.

At 906, a second portion of the data set can be encrypted against the unique encryption key. As shown in FIG. 5A, the second portion of the data set is data blocks A-C of data set 504. The second portion of the data set can be encrypted using an encryption algorithm such that the plaintext is transformed into encrypted data. Then, at 908, the encrypted second portion of the data set can be written to a storage device. Optionally and additionally, as described above, the operations can include additional steps to provide enhanced encryption. For example, as described with regard to FIG. 5B, the unique encryption key used by the encryption algorithm to encrypt the data set can itself be encrypted. For example, the unique encryption key can be encrypted against a user defined encryption key (e.g., user-defined encryption key 508 of FIG. 5B), which can optionally be password protected and/or have access restricted by other means to certain individuals. Alternatively or additionally, after the data set is encrypted, the data blocks of the encrypted data set can be written in a non-sequential order to the storage device, for example, as described above with regard to FIGS. 6A-6B (to a contiguous region of the disk) or FIGS. 7 and 8 (to a plurality of non-contiguous regions of the disk).

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A computer-implemented method for providing enhanced encryption in a data storage system, comprising:
   receiving, using a processor, a data set comprising a plurality of data blocks;
   selecting, using the processor, a first portion of the data set as a unique encryption key, the first portion of the data set comprising one or more of the data blocks;
   encrypting, using the processor, a second portion of the data set using the unique encryption key, the second portion of the data set comprising one or more of the data blocks, wherein each of the first and second portions of the data set comprises different data blocks;
   encrypting, using the processor, the first portion of the data set using a user-defined encryption key;
   partitioning, using the processor, the encrypted data set into a plurality of data blocks, wherein the encrypted data set includes the encrypted first and second portions of the data set; and
   writing, using the processor, the plurality of data blocks of the encrypted data set in a non-sequential order to a storage device.

2. The computer-implemented method of claim 1, further comprising restricting, using the processor, access to the user-defined encryption key.

3. The computer-implemented method of claim 1, wherein the plurality of data blocks of the encrypted data set are written at a contiguous region of the storage device.

4. The computer-implemented method of claim 3, further comprising maintaining, using the processor, a lookup table for storing the non-sequential order of the plurality of data blocks written at the contiguous region of the storage device.

5. The computer-implemented method of claim 1, wherein the plurality of data blocks of the encrypted data set are written at a plurality of non-contiguous regions of the storage device.

6. The computer-implemented method of claim 5, further comprising maintaining, using the processor, a mapping table for storing respective physical locations of the plurality of data blocks written at the plurality of non-contiguous regions of the storage device.

7. The computer-implemented method of claim 1, further comprising serializing, using the processor, the plurality of data blocks of the encrypted data set with a plurality of data blocks of a second encrypted data set.

8. The computer-implemented method of claim 1, wherein the first portion of the data set is at least one of randomly selected, selected by a user, or selected in dependence on a target logical volume for the data set.

9. A non-transitory computer-readable recording medium having computer-executable instructions stored thereon for providing enhanced encryption in a data storage system that, when executed by a processor, cause the processor to:
   receive a data set comprising a plurality of data blocks;
   select a first portion of the data set as a unique encryption key, the first portion of the data set comprising one or more of the data blocks;
   encrypt a second portion of the data set using the unique encryption key, the second portion of the data set comprising one or more of the data blocks, wherein each of the first and second portions of the data set comprises different data blocks;
   encrypt the first portion of the data set using a user-defined encryption key;
   partition the encrypted data set into a plurality of data blocks, wherein the encrypted data set includes the encrypted first and second portions of the data set; and
   write the plurality of data blocks of the encrypted data set in a non-sequential order to a storage device.

10. The non-transitory computer-readable recording medium of claim 9, having further computer-executable instructions stored thereon that, when executed by the processor, cause the processor to restrict access to the user-defined encryption key.

11. The non-transitory computer-readable recording medium of claim 9, wherein the plurality of data blocks of the encrypted data set are written at a contiguous region or non-contiguous region of the storage device.

12. The non-transitory computer-readable recording medium of claim 9, having further computer-executable instructions stored thereon that, when executed by the processor, cause the processor to serialize the plurality of data blocks of the encrypted data set with a plurality of data blocks of a second encrypted data set.

13. The non-transitory computer-readable recording medium of claim 9, wherein the first portion of the data set is at least one of randomly selected, selected by a user, or selected in dependence on a target logical volume for the data set.

14. A storage server computer for providing enhanced encryption, comprising:
   a processor; and
   a memory operably connected to the processor, the memory having computer-executable instructions stored thereon that, when executed by the processor, cause the processor to:
   receive a data set comprising a plurality of data blocks;
   select a first portion of the data set as a unique encryption key, the first portion of the data set comprising one or more of the data blocks;
   encrypt a second portion of the data set using the unique encryption key, the second portion of the data set comprising one or more of the data blocks, wherein each of the first and second portions of the data set comprises different data blocks;
   encrypt the first portion of the data set using a user-defined encryption key;
   partition the encrypted data set into a plurality of data blocks, wherein the encrypted data set includes the encrypted first and second portions of the data set; and
   write the plurality of data blocks of the encrypted data set in a non-sequential order to a storage device.

* * * * *